UNITED STATES PATENT OFFICE.

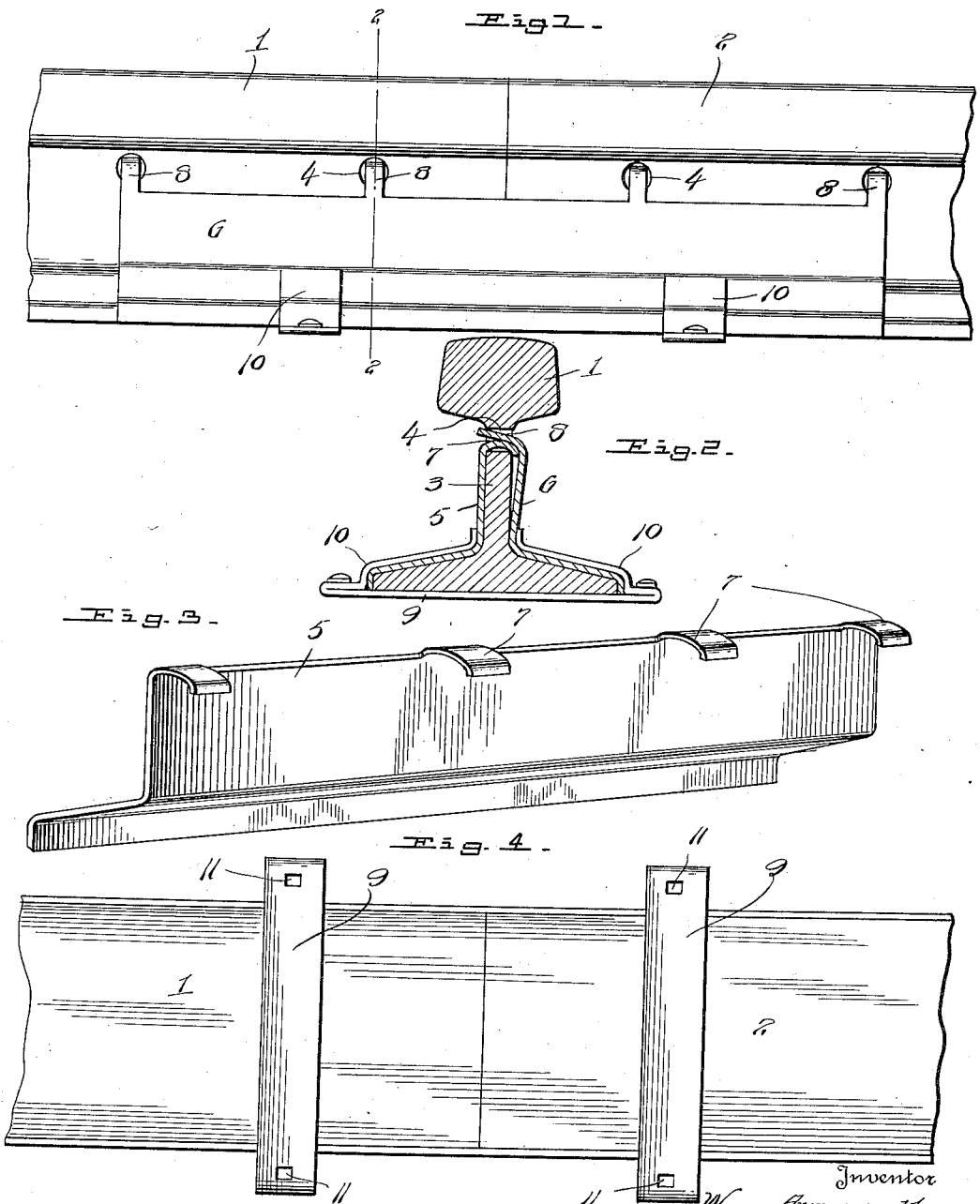

WILLIS ARMSWORTH, OF CERRO GORDO, ILLINOIS.

RAIL-JOINT.

1,092,003.  Specification of Letters Patent.  Patented Mar. 31, 1914.

Application filed December 19, 1913. Serial No. 807,704.

*To all whom it may concern:*

Be it known that I, WILLIS ARMSWORTH, a citizen of the United States, residing at Cerro Gordo, in the county of Piatt, State of Illinois, have invented certain new and useful Improvements in Rail-Joints; and I do hereby declare the following to be a full, clear, and exact description of the invention, such as will enable others skilled in the art to which it appertains to make and use the same.

The present invention is directed to improvements in rail joints, and has for its object to provide the fish plates with means for engaging the meeting ends of the rails to properly hold the same without the aid of bolts.

A further object of the invention is to provide a rail joint which is extremely simple in construction, durable, and one which can be applied to the usual rails.

With these and other objects in view, this invention resides in the novel features of construction, formation, combination and arrangement of parts to be hereinafter more fully described, claimed and illustrated in the accompanying drawing, in which:—

Figure 1 is a side elevation of the device. Fig. 2 is a sectional view on line 2—2 of Fig. 1. Fig. 3 is a perspective view of one of the fish plates. Fig. 4 is a bottom plan view.

Referring to the drawing, the numerals 1 and 2 designate a pair of rails, both of which having their webs 3 provided with openings 4, the same being spaced and arranged in horizontal alinement. Fish plates 5 and 6 are provided, the former having formed integral with its upper edge a plurality of spaced hooks 7, which are designed to engage the openings 4. The fish plate 6 has its upper edge provided with a plurality of upwardly inclined projections 8, which are adapted to engage the openings 4 and to bindingly engage the hooks 7, thus firmly holding the same in the openings 4. A pair of tie plates 9 are provided, and have their ends turned upwardly so as to provide clamps 10 for engaging the lower edges of the fish plates 5 and 6, said tie plates being provided with spike openings 11 so that the rails may be fastened to the ties.

It will be noted that the projections 8 have their upper ends extended from the openings 4 so that when the clamps 10 are in place the fish plate 6 will be held flush against the side of the rail thereby firmly binding the projections in the openings 4 and in overlapping relation with the hooks 7, thus holding the same firmly engaged in the openings 4 when the clamps 10 are in place. It is obvious that the fish plates 5 and 6 can be readily removed upon removal of the clamps 10.

From the foregoing description it will be seen that a rail joint has been provided which is extremely simple, and one in which the usual bolts for connecting the meeting ends of rails are dispensed with.

What is claimed is:—

In a rail joint, the combination with the meeting ends of a pair of rails, said rails having their webs provided with a plurality of openings, of fish plates, one of which has its upper edge provided with a plurality of hooks for engaging the openings, the other fish plate having its upper edge provided with a plurality of projections for engaging said openings, said projections being disposed in overlapping relation with the hooks, and clamps for engaging the lower edges of the fish plates.

In testimony whereof, I affix my signature, in the presence of two witnesses.

WILLIS ARMSWORTH.

Witnesses:
R. E. STROHM,
E. A. STINE.